United States Patent
Wittstadt et al.

(10) Patent No.: US 9,979,257 B2
(45) Date of Patent: May 22, 2018

(54) ELECTROMOTIVE DRIVE, IN PARTICULAR BLOWER DRIVE HAVING A VIBRATION DAMPENING SYSTEM ON A BEARING SIDE

(71) Applicant: BROSE FAHRZEUGTEILE GMBH & CO. KOMMANDITGESELLSCHAFT, WUERZBURG, Wuerzburg (DE)

(72) Inventors: Frank Wittstadt, Sommerach (DE); Marco Stoehling, Schondra (DE)

(73) Assignee: Brose Fahrzeugteile GmbH & Co. Kommanditgesellschaft, Wuerzburg, Wuerzburg (DE)

(*) Notice: Subject to any disclaimer, the term of this patent is extended or adjusted under 35 U.S.C. 154(b) by 11 days.

(21) Appl. No.: 14/554,364

(22) Filed: Nov. 26, 2014

(65) Prior Publication Data

US 2015/0076938 A1 Mar. 19, 2015

Related U.S. Application Data

(63) Continuation of application No. PCT/EP2013/001539, filed on May 24, 2013.

(30) Foreign Application Priority Data

May 26, 2012 (DE) .................. 10 2012 010 480

(51) Int. Cl.
*H02K 5/10* (2006.01)
*H02K 7/08* (2006.01)
(Continued)

(52) U.S. Cl.
CPC .............. *H02K 7/083* (2013.01); *H02K 5/10* (2013.01); *H02K 5/15* (2013.01); *H02K 5/1672* (2013.01); *H02K 5/24* (2013.01)

(58) Field of Classification Search
CPC .......... H02K 5/10; H02K 5/15; H02K 5/1672; H02K 5/24; H02K 7/083; F16C 25/04; F16C 25/08
(Continued)

(56) References Cited

U.S. PATENT DOCUMENTS 3,114,388 A * 12/1963 Hoen .................. F04B 39/1033
                                                        137/512
4,752,178 A *  6/1988 Greenhill ................ F16B 21/18
                                                        403/326
(Continued)

FOREIGN PATENT DOCUMENTS

CN       102257704 A    11/2011
DE         1171511 B     6/1964
(Continued)

OTHER PUBLICATIONS

Stoehling, English Translation of WO 2010/075844, Jul. 8, 2010.*
Tsuchida et al., English Machine Translation of JP 2003074549; IDS.*

*Primary Examiner* — Bernard Rojas
*Assistant Examiner* — Rashad Johnson
(74) *Attorney, Agent, or Firm* — Laurence A. Greenberg; Werner H. Stemer; Ralph E. Locher

(57) ABSTRACT

An electromotive drive being a commutator motor has a motor shaft being rotatably mounted on axially opposite sides in shaft bearings which are each covered by an end plate. A damping system for damping sound is arranged on that bearing side, which is averted from the end plate, of at least one of the shaft bearings. The damping system has an annular sealing disk and an annular sliding disk with an integrated spring element.

6 Claims, 3 Drawing Sheets

(51) Int. Cl.
 *H02K 5/167* (2006.01)
 *H02K 5/15* (2006.01)
 *H02K 5/24* (2006.01)

(58) Field of Classification Search
 USPC ............ 310/50, 51, 89, 90, 90.5; 360/98.07,
 360/99.04, 99.07, 99.08
 See application file for complete search history.

(56) References Cited

U.S. PATENT DOCUMENTS

| | | | | |
|---|---|---|---|---|
| 4,836,794 A * | 6/1989 | Barr | ................. | H01R 13/65802 439/135 |
| 4,887,637 A * | 12/1989 | Ketner | ................. | G05D 7/0133 137/504 |
| 4,887,916 A * | 12/1989 | Adam | ................... | F16C 23/045 267/161 |
| 5,510,660 A * | 4/1996 | Flatau | ..................... | H01L 41/12 310/26 |
| 5,639,074 A * | 6/1997 | Greenhill | ................ | F16F 1/328 267/158 |
| 5,683,184 A | 11/1997 | Striedacher et al. | | |
| RE35,855 E * | 7/1998 | Blaettner | ................ | H02K 1/17 310/90 |
| 5,914,550 A | 6/1999 | Preiyathamby et al. | | |
| 6,250,618 B1 * | 6/2001 | Greenhill | ................ | F16F 1/027 267/160 |
| 6,254,071 B1 * | 7/2001 | Greenhill | ................ | F16F 1/328 267/158 |
| 6,388,351 B1 * | 5/2002 | Fisher | ................. | H02K 5/1732 310/90 |
| 6,669,184 B2 * | 12/2003 | Cai | .......................... | F16F 3/02 267/162 |
| 6,998,746 B2 * | 2/2006 | Simpson | ............. | H02K 5/1672 310/51 |
| 8,256,599 B2 * | 9/2012 | Goto | ................... | F16D 25/0638 192/109 F |
| 8,884,477 B2 | 11/2014 | Stoehling et al. | | |
| 8,974,164 B2 * | 3/2015 | Benedetti | .............. | F16B 33/006 411/186 |
| 9,453,549 B2 * | 9/2016 | Marvuglio | .............. | F16F 1/328 |
| 2003/0042804 A1 | 3/2003 | Cook et al. | | |
| 2003/0136010 A1 * | 7/2003 | Childs | ....................... | B27B 5/32 30/388 |
| 2005/0018935 A1 * | 1/2005 | Simpson | ................ | F16C 27/02 384/204 |
| 2005/0220564 A1 * | 10/2005 | Hinson | ................ | F16B 5/0241 411/353 |
| 2005/0271497 A1 * | 12/2005 | Heim | ..................... | F16F 1/328 411/544 |
| 2012/0045158 A1 * | 2/2012 | Mashino | ............... | F16C 25/083 384/513 |
| 2015/0275962 A1 * | 10/2015 | Sakon | ................... | F16C 35/063 384/517 |

FOREIGN PATENT DOCUMENTS

| | | |
|---|---|---|
| DE | 102008062432 A1 | 7/2010 |
| EP | 0259714 A1 | 3/1988 |
| EP | 0698956 A1 | 2/1996 |
| JP | 2003074549 A | 3/2003 |
| WO | 2010075844 A2 | 7/2010 |

\* cited by examiner

ELECTROMOTIVE DRIVE, IN PARTICULAR BLOWER DRIVE HAVING A VIBRATION DAMPENING SYSTEM ON A BEARING SIDE

CROSS-REFERENCE TO RELATED APPLICATION

This is a continuation application, under 35 U.S.C. § 120, of copending international application No. PCT/EP2013/001539, filed May 24, 2013, which designated the United States; this application also claims the priority, under 35 U.S.C. § 119, of German patent application No. DE 10 2012 010 480.4, filed May 26, 2012; the prior applications are herewith incorporated by reference in their entirety.

BACKGROUND OF THE INVENTION

Field of the Invention

The invention relates to an electromotive drive. A drive of this kind is known from international patent disclosure WO 2010/075844 A2.

In an electromotive drive of this kind, which often drives a fan impeller of a blower in a heating and air-conditioning system of a motor vehicle, the motor shaft of the electric motor is rotatably mounted in sliding bearings, which are configured as cup-and-ball bearings, both on the brush system side (BS), on which commutator laminations of the motor are arranged. The brushes make contact with the commutator laminations, and also on the opposite side (AS). The cup-and-ball bearings are pressed against an end plate by a clamping frame. The motor shaft projects out of the end plate which is close to the commutator by way of a shaft section on which the fan impeller is fastened by its central hub.

In order to avoid undesired noise on account of the axial play of the motor shaft and therefore of the motor rotor/impeller system in an electromotive drive of this kind, in the case of the drive known from WO 2010/075-844 A2 a damping system for damping sound is arranged at least on that bearing side, which is averted from the end plate, of the BS-side shaft bearing. The damping system has a sealing disk or annular sealing disk and a sliding disk (thrust washer) or annular sliding disk with sliding properties. A corrugated spring, which is in the form of a spring ring and is mounted on the motor shaft, is inserted between the sealing disk and the sliding disk as a spring element. The damping system also has an annular damping element on that side of the sealing disk which faces the shaft bearing. In the assembled state of the damping system, the corrugated spring is situated in an annular space which is formed between the damping element of the sealing disk and the motor shaft, and therefore the damping element coaxially surrounds the corrugated spring.

The damping system serves to reduce the sound level, in particular of stop noises which are caused by bearing play, but additionally to damp what are known as U tones (whining noises) which are caused by operation-related disturbances with each revolution of the motor and associated resonance phenomena.

SUMMARY OF THE INVENTION

The invention is based on the object of improving an electromotive drive of the kind cited in the introductory part in respect of its damping system.

To this end, the electromotive drive has a commutator motor. A motor shaft of the commutator motor is rotatably mounted on axially opposite sides in shaft bearings which are each covered by an end plate. The electromotive drive further has a damping system for damping sound on that bearing side, which is averted from the end plate, of at least one of the shaft bearings. The damping system has an annular sealing disk, an annular sliding disk and a spring element which is integral with the annular sliding disk. In other words, the damping system has an annular sealing disk and an annular sliding disk with an integrated spring element.

The damping system expediently additionally has an annular damping element which is provided on the inner side of the annular sealing disk, which inner side faces the shaft bearing. A clamping frame which is placed between the shaft bearing and the damping system is supported, over the periphery, on the end plate. Owing to the use of a clamping frame which is known per se, which is placed between the shaft bearing and the damping system and which is supported, over the periphery, on the end plate, the shaft bearing, which is expediently configured as a cup-and-ball bearing, is reliably pressed in the direction of the end plate which is situated opposite the damping system.

In an advantageous refinement, the spring element is realized in the form of spring arms which are integrally formed on the annular sliding disk, that is to say are integral or form one piece with the annular sliding disk. The spring arms, which are preferably in the form of a corrugated spring, extend in the manner of an arc of a circle in the circumferential direction of the annular sliding disk, wherein the free ends of the spring arms project out of the disk surface of the annular sliding disk, or the main body of the annular sliding disk, in the axial direction.

According to an expedient development, the annular sliding disk, which is also simply called the sliding disk in the text which follows, has driver sections which are in the form of a sector of a circle. In this refinement, the spring arms are integrally formed on mutually averted circle radii of the driver sections, wherein three spring arms and three driver sections are preferably alternately arranged in a uniformly distributed manner over the circumference of the annular sliding disk.

The driver sections particularly preferably project at least slightly in the radial direction beyond the spring arms which are integrally formed on them. In connection with corresponding rotary bearing stops on the annular sealing disk, also called the sealing disk in the text which follows, these excess radial lengths of the driver elements serve the purpose of rotary coupling between the sliding disk and the sealing disk. To this end, the annular sealing disk suitably has, over the circumference, a circumferential collar, at least one rotation stop for the annular sliding disk being integrally formed on the inner face of the collar.

In the assembled state of the damping system, the annular sealing disk and the annular sliding disk are expediently latched to one another. To this end, an undercut contour is preferably integrally formed on the collar of the annular sealing disk. In this preferred embodiment, the driver sections of the annular sliding disk perform a dual function, specifically first they establish the latching to the annular sealing disk, for which purpose the driver sections of the annular sliding disk engage behind the undercut contour of the annular sealing disk. Second, the driver sections form, by way of their sections which project radially beyond the spring arms, a contact contour for the or each rotation stop which is integrally formed on the collar of the annular sealing disk.

In the locked state of the sliding disk to the sealing disk, the driver elements form a stop in the corresponding rotation direction of the motor or of the motor shaft as soon as the sections of the driver elements which project radially beyond the spring arms have passed beyond or through the distance, the angular measurement of which amounts to 120° for example, between two rotation stops of the sealing disk when first commissioned.

In an advantageous refinement, the spring arms are of a corrugated configuration with free ends which are directed at least slightly axially to the disk surface of the annular sliding disk. The arm length of each of the preferably three spring arms is approximately one sixth of the circumference of the annular sliding disk. The sliding disk with the spring element integrally formed on it is suitably composed of a thermoplastic elastomer, in particular of Hytrel.

Mounting of the damping system on the motor shaft is expediently configured with a press-fit. In this case, the pressing force or adhesion of the sealing disk on the motor shaft is greater than that of the sliding disk with the integrally formed spring element. Owing to a certain ability of the sealing disk to slide on the motor shaft, at least the sealing disk may be guided along the motor shaft axially in the direction of the sliding disk which is integral with the spring element for the purpose of locking the two disks as they are being connected to the damping system.

Following a first relative rotation between the two disks, the rotation stop between the disks is reached, and therefore the two disks and therefore the entire damping system then always sit firmly on the motor shaft and rotate with the motor shaft in relation to the stationary shaft or cup-and-ball bearing. The collar which, to this end, is integrally formed on the preferably shell-like sealing disk and is directed toward the shaft bearing serves as an oil trap in order to capture sliding bearing oil which is spun out as a result of the centrifugal force and to return the oil to the bearing.

The suitable material of the sliding disk which is integral with the spring element is steel, and therefore the sealing disk with the integrated spring element cannot shrink. This provides the advantage of reliable latching to the annular sealing disk.

The advantages which are achieved by the invention are in particular that, owing to the use of the damping system which is preferably provided at the two bearing points of the motor shaft of an electromotive blower drive, first noises or tones which are generated by axial shaft deflections and also by the rotor/impeller system and/or commutator/brush system are considerably damped. Second, on account of the integral configuration of the annular sliding disk and of the spring element, the functions of vibration damping and axial mounting are combined, wherein a damping system which contains comparatively few parts is provided overall.

Owing to the number of components, this number being reduced in comparison to the prior art, of the damping system according to the invention, also called damping assembly in the text which follows, the damping system is of simple construction and, in particular, can be assembled in a particularly simple and fault-free manner. Therefore, identification of an incomplete assembly is simplified owing to the integration of the spring element into the annular sliding disk or the integral configuration of the annular sliding disk and spring element, especially since the spring element is not visible in the installed state of the damping assembly.

Other features which are considered as characteristic for the invention are set forth in the appended claims.

Although the invention is illustrated and described herein as embodied in an electromotive drive, in particular a blower drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts which correspond to one another are provided with the same reference symbols throughout the figures.

Figure 1:
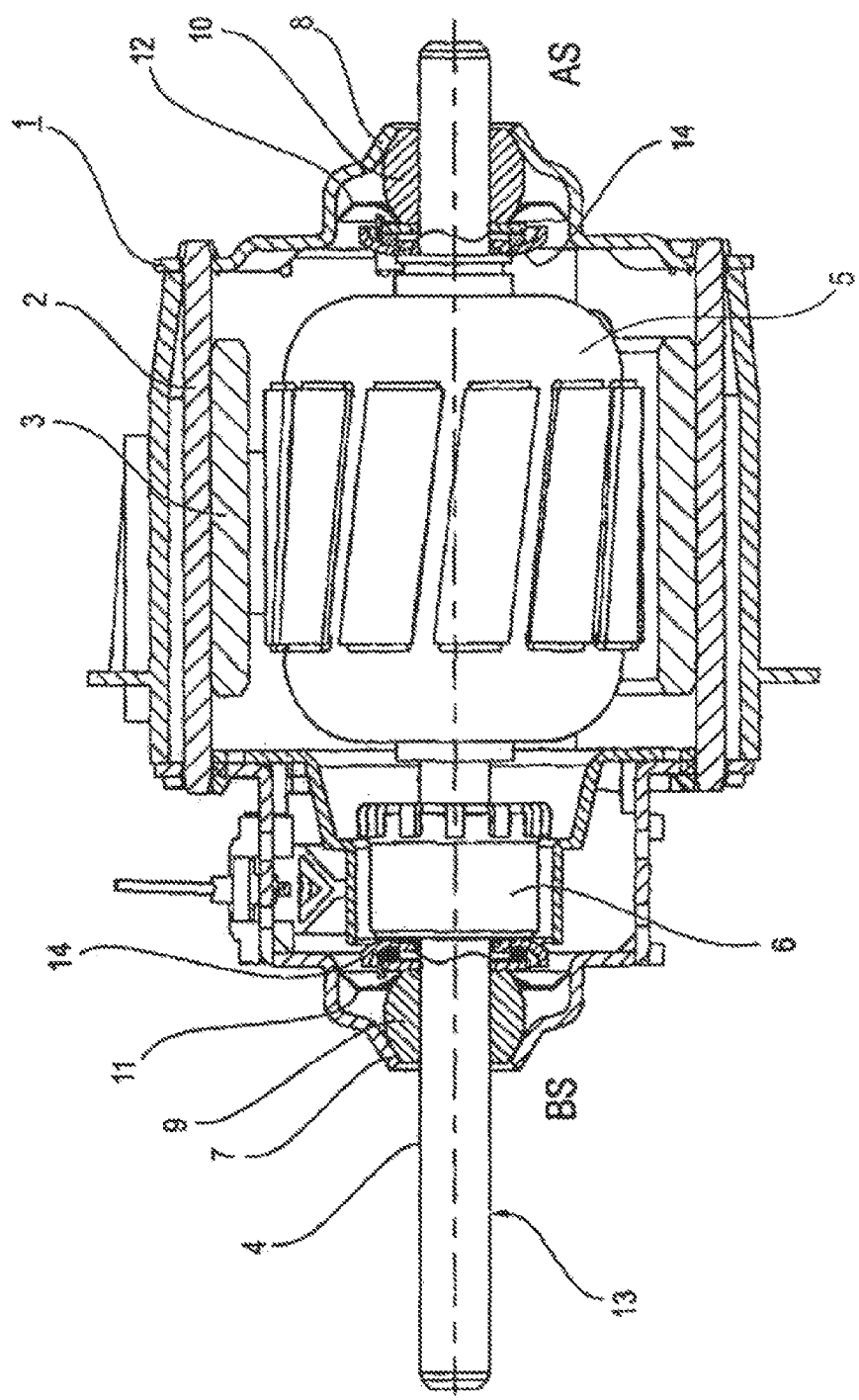
FIG. 1 is a diagrammatic, partial longitudinal sectional view through an electromotive drive for a heating and air-conditioning system blower in a motor vehicle, having a BS-side cup-and-ball bearing and an AS-side cup-and-ball bearing with a damping system according to the invention.

Referring now to the figures of the drawings in detail and first, particularly to FIG. 1 thereof, there is shown an electromotive drive in the form of a commutator motor 1 having a motor housing (pole pot) 2, a number of shell-like exciter or permanent magnets 3, which number corresponds to the number of poles of the motor 1, being mounted on the inside circumference of the motor housing. A motor shaft 4 carries, in a manner not illustrated in any detail, a rotor 5 of the commutator motor 1, the rotor 5 being configured as a laminated rotor core with rotor windings wound therein. A commutator 6 which is likewise mounted on the motor shaft 4 has commutator laminations 6a with lamination connections 6b (FIG. 2) which are connected to the rotor windings of the rotor 5. Brushes make contact with the laminations 6a of the commutator 6 in a manner known per se. This motor side is often also designated as a brush or brush system side or BS (BS-side) for short. The opposite side is designated AS (AS-side).

On the BS-side of the commutator motor 1, a BS-side end plate 7 is fastened to the motor housing 2 at the motor end which is close to the commutator. An AS-side end plate 8 is fastened to the motor housing 2 at the opposite end, which is remote from the commutator, of the motor shaft 4. The two end plates 7, 8 accommodate cup-and-ball bearings 9 and, respectively, 10 in which the motor shaft 4 is rotatably mounted by an oil film. The two stationary cup-and-ball bearings 9, 10 are each pressed against the respective end plate 7 and, respectively, 8 by a clamping frame 11, 12 and clamped. In the process, the clamping frame 11, 12 is supported on the respective end plate 7 and, respectively, 8.

The commutator-side end of the motor shaft 4 projects out of the end plate 7 on the BS side by way of a sufficiently long shaft section 13, in order to receive a fan impeller of a heating and air-conditioning system blower of a motor vehicle in the manner known from FIG. 1 of German utility model DE 295 13 633 U1, the fan impeller being pressed by way of its hub onto the section of the motor shaft 4 there. The commutator motor 1, which drives the fan impeller when it rotates, therefore serves as a blower drive.

Figure 2:
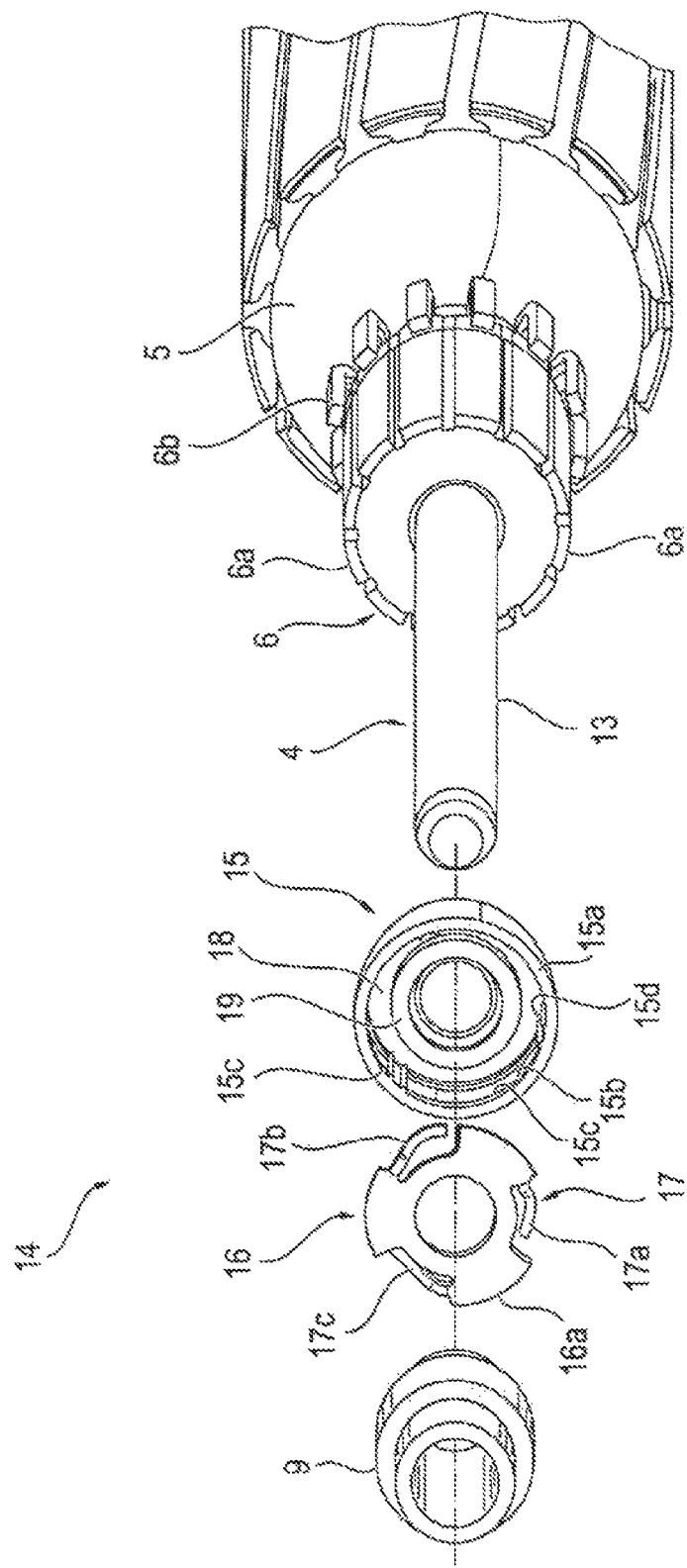
FIG. 2 is an exploded, perspective view of the damping system according to the invention with, in a direction of a motor shaft downstream of the BS-side cup-and-ball bearing, an annular sealing disk and an annular sliding disk with an integrally formed spring element.

As is shown comparatively clearly in FIG. 2, a damping system or assembly 14 is provided at least at the BS-side bearing point, preferably also at the AS-side bearing point. The damping system or assembly is mounted onto the motor shaft 4 on that bearing side, which is averted from the respective end plate 7, 8, of the cup-and-ball bearing 9 and, respectively, 10. The damping system 14 absorbs the axial play which extends in the longitudinal direction of the motor shaft 4.

The damping system 14 serves first to damp stop noises that are caused by the axial deflection of the system that is formed by the rotor 5 and the commutator 6, including the motor shaft 4, the system also including the fan impeller in the case of a blower drive. The damping system 14 therefore reduces the noise level and also damps those noises which are known as U or whining tones which are generated by the commutator/brush system. The corresponding development of noise can be attributed to disturbances with each revolution of the motor, the disturbances being caused by the relative movement of the commutator laminations and the brushes moving over them. These disturbances cause characteristic noises at housing part-specific resonance points in the relatively large plastic housing.

The damping system 14 is made up of an annular sealing disk 15, simply called the sealing disk in the text which follows, and an annular sliding disk 16, simply called the sliding disk in the text which follows, with an integrated spring element 17. The spring element 17, which contains three spring arms 17a which are integral with the sliding disk 16, faces the respective cup-and-ball bearing, in this case the cup-and-ball bearing 9. A defined spring path, which is approximately 0.2 mm long, is formed between the sealing disk 15 and the sliding disk 16. In the assembled state of the damping system 14, the spring arms 17a bear against the sealing disk 15. In this case, a damping element 18, which is integrally formed on the sealing disk 15 or is inserted into the sealing disk and is in the form of a ring, coaxially surrounds the spring arms 17a.

The damping element 18 is preferably an integral constituent part of the sealing disk 15 and is composed of a damping material which is comparatively soft in relation to the comparatively hard material of the rest of the sealing disk 15. A shaft seal 19, which is likewise composed of the damping material and can likewise be integral with the rest of the sealing disk 15, engages around the motor shaft 4 and in the process forms a cylindrical or sleeve-like seal transition between the sealing disk 15 and the motor shaft 4.

The approximately shell-like sealing disk 15 has a circumferential collar 15a in order to capture sliding bearing oil, which has been spun out for operation-related reasons, in order to protect the commutator 6. The collar 15a is additionally used first in order to latch the sliding disk 16 with the integrated spring element 17 to the sealing disk 15. To this end, a preferably circumferential undercut contour 15b is integrally formed on the collar 15, the undercut contour extending radially in the direction of the shaft 4. Second, cams 15d on the inside, that is to say integrally formed on the collar inner wall 15c or worked from the collar inner wall by shaping or deformation, serve as rotation stops for the sliding disk 16.

In the state in which the sealing disk 15 and the sliding disk 16 with the integrated spring element 17 are latched to one another, driver elements 16a, of which only one is designated in FIG. 2, engage behind the undercut contour 15b of the sealing disk 15. As a result, the sealing disk 15, which is pressed onto the motor shaft 4, can be axially displaced in relation to the sliding disk 16, which is likewise pressed onto the motor shaft 4 but is practically immovable, and is therefore fixed to the sliding disk by latching.

Figure 3A:
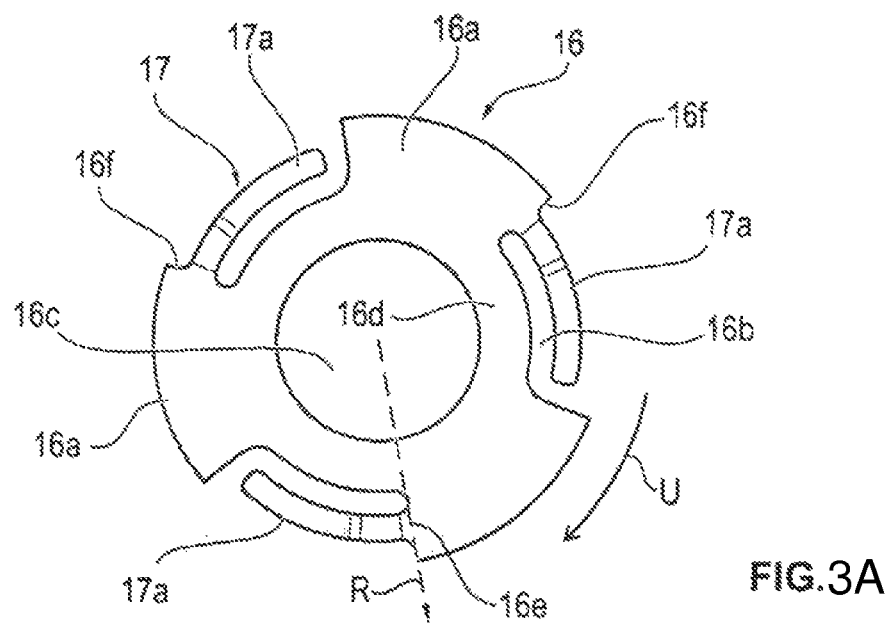
FIG. 3A is a top plan view of the sliding disk which is integral with the spring element.
Figure 3B:
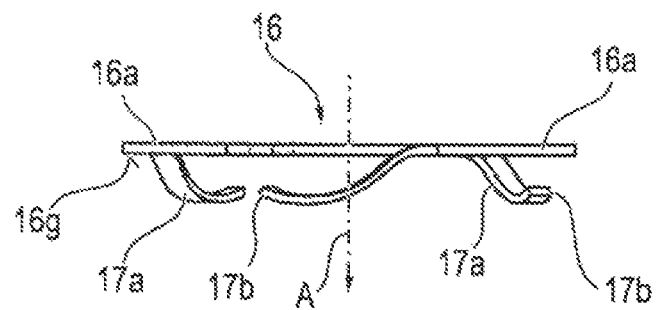
FIG. 3B is a side view of the sliding disk which is integral with the spring element.
Figure 3C:
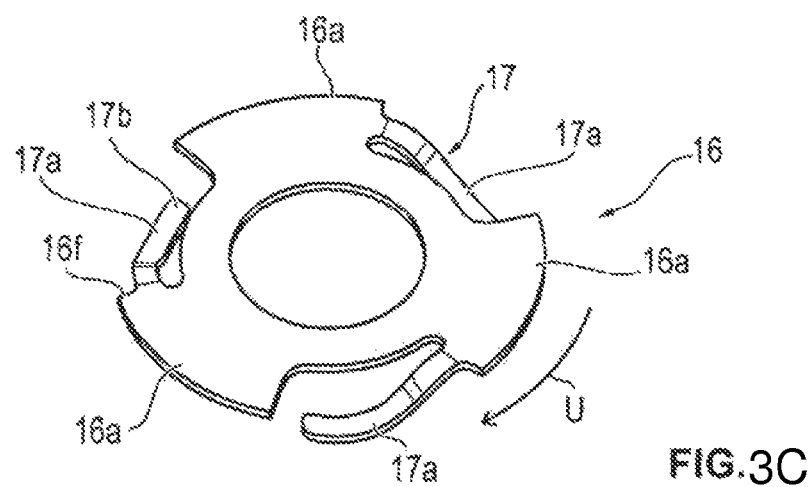
FIG. 3C is an oblique perspective view of the sliding disk which is integral with the spring element.

As is shown comparatively clearly with reference to the sliding disk 16 with the integrated spring element 17, illustrated in FIGS. 3A to 3C, the radially extending driver elements 16a are offset through 120° in relation to one another. The sliding disk has sector-like recesses 16b between the driver elements 16a, ring sections 16d adjoining the recesses—toward the central disk opening 16c in the radial direction R. The spring arms 17a are integrally formed on the driver elements 16a in the region of their circle radii 16e and extend into the sector-like recesses 16b in the sliding disk 16 in the manner of an arc of a circle in a circumferential direction U of the sliding disk 16 with the integrated spring element 17.

The connection between the spring arms 17a and the driver elements 16a of the sliding disk 16 is positioned in such a way that the driver elements 16a project beyond the spring arms 17a in the radial direction R so as to form contact edges 16f. In the latched state of the sealing disk 15 and the sliding disk 16, the contact edges 16f form the mating stop of the sliding disk 16 to the rotation stop of the sealing disk 15 in the form of the cams 15d of the sealing disk.

As shown in FIGS. 3B and 3C, the spring arms 17a of the spring element 17, which is integral with the sliding disk 16, protrude out of the plane or surface 16g of the sliding disk 16 in the axial direction A. In this case, the spring arms 17a are configured in the manner of an arc of a circle in the circumferential direction U of the sliding disk 16 and in the manner of a corrugation in the axial direction A. The spring arms 17a which are integral with the sliding disk 16 therefore form a kind of annular spring element 17 with sinusoidal waves. In this case, the spring arm ends 17b are oriented at least slightly toward the disk top face 16g over the course of the sinusoidal or corrugated formation.

The following is a summary list of reference numerals and the corresponding structure used in the above description of the invention:
1 Commutator motor
2 Motor housing
3 Exciter magnet
4 Motor shaft
5 Rotor
6 Commutator
7 BS-side end plate
8 AS-side end plate
9 Cup-and-ball bearing
10 Cup-and-ball bearing
11 BS-side clamping frame
12 AS-side clamping frame
13 Shaft section
14 Damping system/assembly
15 Sealing/annular sealing disk
15a Collar 15b Undercut contour
15c Collar inner wall
15d Cam/rotation stop
16 Sliding/annular sliding disk
16a Driver element
16b Recess
16c Disk opening
16d Ring section
16e Circle radius
16f Contact edge
16g Disk top face/plane
17 Spring element
17a Spring arm
17b Spring arm end
18 Damping element
19 Shaft seal
A Axial direction
R Radial direction
U Circumferential direction

The invention claimed is:

1. An electromotive drive being a commutator motor, the electromotive drive comprising:

shaft bearings;

a motor shaft rotatably mounted on axially opposite sides in said shaft bearings;

end plates, each of said end plates covering one of said shaft bearings;

a damping system for damping sound disposed on a bearing side, averted from said end plate, of at least one of said shaft bearings, said damping system having an annular sealing disk, a spring element and an annular sliding disk facing one of said shaft bearings, said spring element being an integral constituent part of said annular sliding disk;

said spring element having spring arms running in a manner of an arc of a circle, being in a form of a corrugated spring, and disposed along a circumference of said annular sliding disk, said spring arms projecting out of a disk surface of said annular sliding disk in an axial direction;

said annular sliding disk with said spring element being composed of metal and having driver elements being in a form of a sector of a circle, said annular sliding disk having recesses formed therein and disposed between said driver elements;

said spring arms being integrally formed on mutually averted circle radii of said driver elements and extending into said recesses in said annular sliding disk;

said driver elements projecting in a radial direction beyond said spring arms integrally formed on said driver elements;

said annular sealing disk and said annular sliding disk being latched with one another;

said annular sealing disk having a circumference and over said circumference, a circumferential collar with an undercut contour integrally formed therein;

at least one rotation stop integrally formed on an inner face of said circumferential collar, said rotation stop, together with a radial over-projection of at least one of said driver elements, being used for rotation coupling between said annular sliding disk and said annular sealing disk; and following a first relative rotation between said annular sliding disk and said annular sealing disk, said rotation stop disposed between said annular sliding disk and said annular sealing disk is reached, so that said annular sliding disk and said annular sealing disk firmly rest on said motor shaft and rotate with said motor shaft relative to said shaft bearings being stationary shaft bearings.

2. The electromotive drive according to claim 1, wherein three of said spring arms and three of said driver elements are alternately disposed in a uniformly distributed manner over the circumference of said annular sliding disk.

3. The electromotive drive according to claim 1, wherein an arm length of each of said spring arms is approximately ⅙ of the circumference of said annular sliding disk.

4. The electromotive drive according to claim 1, wherein said spring arms have spring arm ends which are directed at least slightly axially to a surface of said annular sliding disk.

5. The electromotive drive according to claim 1, wherein said damping system has an annular damping element on an inner side of said annular sealing disk, said inner side facing one of said shaft bearings.

6. The electromotive drive according to claim 1, wherein said driver elements of said annular sliding disk first engage behind said undercut contour to establish a latching connection to said annular sealing disk, and second have a contact edge for said rotation stop of said annular sealing disk.

* * * * *